B. O. AUSTIN.
MOTOR CONTROL SYSTEM.
APPLICATION FILED NOV. 12, 1920.
1,430,528. Patented Oct. 3, 1922.
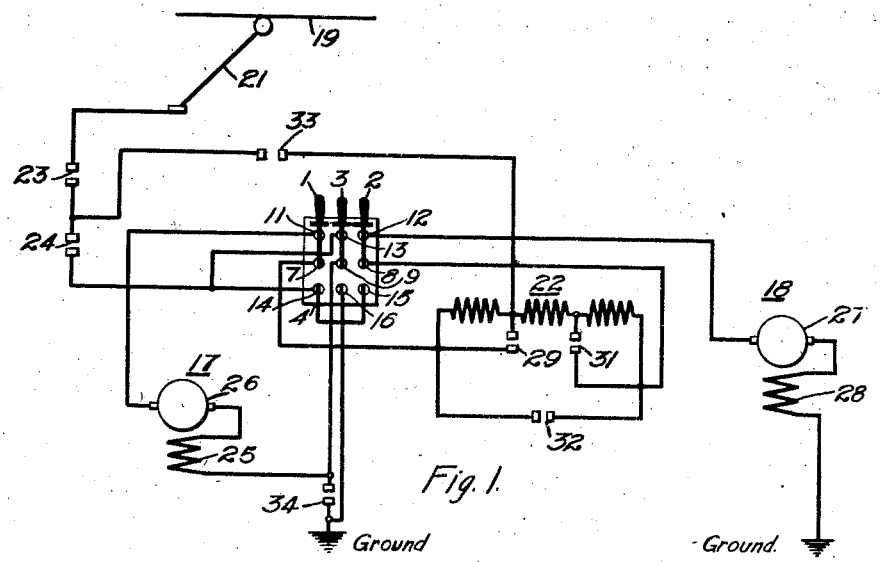
Fig. 1.
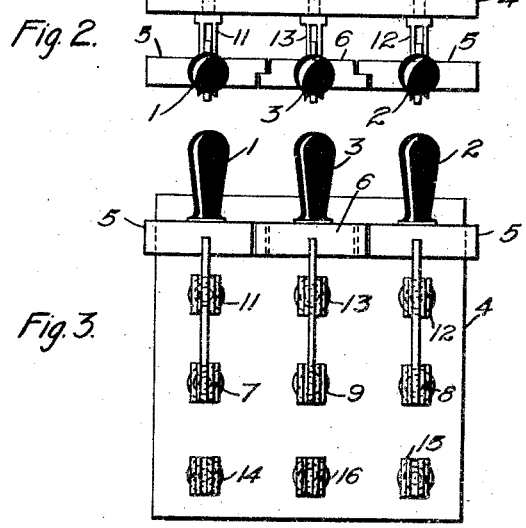
Fig. 2.
Fig. 3.
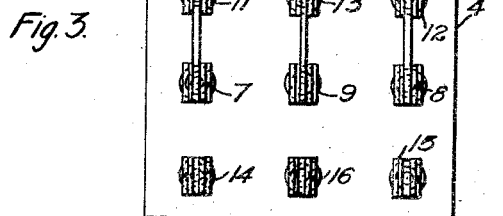
Fig. 4.
WITNESSES:
A. L. Jeffrey
H. C. Lowe
INVENTOR
Bascum O. Austin
BY
Wesley G. Carr
ATTORNEY Patented Oct. 3, 1922.

1,430,528

UNITED STATES PATENT OFFICE.

BASCUM O. AUSTIN, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed November 12, 1920. Serial No. 423,544.

*To all whom it may concern:*

Be it known that I, BASCUM O. AUSTIN, a citizen of the United States, and a resident of Wilkinsburg, in the county of Allegheny and State of Pennsylvania, have invented a new and useful Improvement in Motor-Control Systems, of which the following is a specification.

My invention relates to motor-control systems and it has particular relation to control systems that are adapted for operating the propelling motors of electric cars.

The object of my invention is to provide novel means for disconnecting an impaired motor from a control system of the type wherein a plurality of motors are successively connected in series and in parallel relation.

Heretofore, various systems have been proposed for controlling the operation of a plurality of motors that were connected in series or in parallel relation, which systems were adaptable to govern the partial operation of the remaining motors after one of the motors was disconnected from the system. According to my invention, I provide relatively simple means for disconnecting one of a plurality of motors from a control system, which means is capable of connecting the motors in both series and parallel relation. The means employed constitute a plurality of switches which are adaptable to so change the connections of a control system that, although one of the motors is disconnected from the system, a master controller may be safely and effectively notched through all its positions.

For a better understanding of my invention, reference should be made to the accompanying drawing;

Figure 1 of which is a schematic view of a motor-control system embodying my invention.

Figs. 2 and 3 are views in plan and in side elevation, respectively, of a structure comprising a plurality of switches that are utilized in the control system shown in Fig. 1.

Fig. 4 is a chart, of a well-known form, showing the sequence of operation of the contactors that are employed in the control system shown in Fig. 1.

Referring particularly to Figs. 2 and 3, a plurality of manually operated double-throw, knife-blade switch members 1, 2 and 3 are pivotally mounted on an insulating base member 4. Knife-blade switch members 1 and 2 are provided with insulating cross-members or barriers 5 which are adapted to so interlock with an insulating cross-member or barrier 6 of the switch member 3 that the latter will be actuated from its normally closed or upper position if either switch member 1 or switch member 2 is actuated from its upper position.

The switch members 1, 2 and 3 are provided with central contact terminals or hinge studs 7, 8 and 9, respectively, and may be actuated into engagement with upper contact terminals or jaws 11, 12 and 13, and lower contact terminals or jaws 14, 15 and 16, respectively. It is impossible to actuate either of the outer knife-blade switch members 1 or 2 into lower position, corresponding to jaws 14 and 15, respectively, unless the central knife-blade switch member 6 occupies its lower position, corresponding to jaw 16.

Referring to Fig. 1, the knife-blade switch members 1, 2 and 3 are employed in a control system comprising propelling motors 17 and 18 of an electric car. A suitable master controller (not shown) is provided for operating the contactors which control the operation of the motors, in accordance with a familiar practice.

In starting the car, the motors 17 and 18 are energized from the supply source of energy, such as trolley 19, by a circuit established through trolley pole 21, circuit-breaker or line switch 23, series contactor 24, contact terminals 13 and 9 which are connected by switch member 3, series field-magnet winding 25 and armature 26 of the motor 17, contact terminals 11 and 7 which are connected by switch member 1, starting resistor 22, contact terminals 8 and 12 which are connected by switch member 2, armature 27 and series field-magnet winding 28 of the motor 18 to ground, as indicated by "Position $a$" in the sequence chart, Fig. 3.

Accelerating contactors 29, 31 and 32 may then be closed in succession to shunt portions of the starting resistor 22, thereby accelerating the motors 17 and 18, as indicated in lines $b$, $c$ and $d$ of Fig. 3.

After the starting resistor 22 has been shunted, the motors 17 and 18 are connected in parallel relation by actuating the master controller to the next running position e, thereby closing the contactors 33 and 34, after opening contactors 24, 29 and 31.

A circuit is thereby established from the circuit-breaker 23 through parallel contactor 33, portions of resistor 22 in parallel relation and accelerating contactor 32, contact terminals 7 and 11, which are connected by switch member 1, armature 26, series field-magnet winding 25 of motor 17, and contactor 34 to ground.

A second circuit is also established through portions of the starting resistor 26 in parallel relation and accelerating contactor 32, contact terminals 8 and 12 which are connected by switch member 2, armature 27, and series field-magnet winding 28 of the motor 18 to ground. The motors 17 and 18 are then accelerated by the contactors 31 and 29 closing in the order named, as indicated in positions f and g of Fig. 3, thereby bringing the motors to full speed.

If, for any reason, it is considered necessary or desirable to render the motor 17 inoperative, switches 1 and 3 are thrown from their upper position to their lower position and the controller operated in the same manner as before. The operator is required to employ but one hand to actuate the switch members 1 and 3, as the switch member 3 will be actuated by the barrier 5 of the switch 1.

When the next start is made, the motor 18 is energized by a circuit from circuit breaker 23 through series contactor 24, contact terminals 14 and 7, which are connected by switch member 1, starting resistor 22, contact terminals 8 and 12, which are connected by switch member 2, armature 27 and series field magnet winding 28 of motor 18 to ground.

Motor 18 is then accelerated by contactors 29, 31 and 32 closing in the order named, which is the same order as when motors 17 and 18 are operated together.

If the master controller is actuated beyond position d, corresponding to full series connection, series contactor 24 and accelerating contactors 29 and 31 open and parallel contactor 33 and ground contactor 34 close, thereby establishing a circuit from circuit breaker 23 through parallel contactor 33, portions of starting resistor 22 in parallel relation and accelerating contactor 32, contact terminals 8 and 12, which are bridged by switch member 2, armature 27 and series field magnet winding 28 of motor 18 to ground.

The motor is again accelerated by contactors 31 and 29 closing successively, thereby completing the shunting of the starting resistor 22.

If it is desired to operate the motor 17 without operating the motor 18, switches 2 and 3 are moved from their upper to their lower positions by the operator actuating the handle of switch 2, and switch 1 is left in its upper position. The motor 18 is then disconnected from the remainder of the control system and, upon the master controller being actuated, a circuit is first established from circuit-breaker 23, through series contactor 24, contact terminals 15 and 8, which are connected by switch member 2, starting resistor 22, contact terminals 7 and 11 which are connected by switch member 1, armature 26 and series field-magnet winding 25 of motor 17 and contact terminals 9 and 16, which are connected by switch member 3, to ground. The motor 17 is accelerated by contactors 29, 31 and 32 closing in the order named.

If the controller is operated beyond the series positions to the parallel positions, a circuit is established from circuit-breaker 23, through parallel contactor 33, portions of the starting resistor 22 in parallel relation and accelerating contactor 32, contact terminals 7 and 11, which are connected by switch member 1, armature 26 and series field-magnet winding 25 of motor 17 and contactor 34, to ground.

The motor 17 is further accelerated by the contactors 31 and 29 being closed in succession.

From the above description it is apparent that no change need be made in the master controller which governs the operation of the contactors 24, 29, 31, 32, 33 and 34, when it is desired to disconnect one of the motors from the control system and that these contactors may close in the same order through the complete sequence when either the motor 17 or the motor 18 is operating alone. It is, therefore, only necessary for the motorman to actuate the switch members 1 and 3 from their upper to their lower positions to disconnect or cut out the motor 17 from the remainder of the control system, or to actuate the knife-blade switches 2 and 3 from their upper to their lower positions to disconnect the motor 18 from the remainder of the control system.

The purpose of interlocking the switches 1 and 2 with the switch 3 is to prevent improper circuits being formed by the knife-blade switch 3 remaining in its upper position when either the knife-blade switch 1 or the switch 2 is actuated from its upper to its lower position. The knife-blade switches 1, 2 and 3, being independent of the master controller, may be positioned some distance therefrom, as convenience requires.

While I have shown my invention in a preferred form, it is apparent that minor modifications may be made in the arrangement of apparatus and circuits without departing from the spirit thereof. I desire, therefore, to be limited only by the scope of the appended claims.

I claim as my invention:

1. In a control system, the combination with a plurality of dynamo-electric machines, a resistor therebetween, and a plurality of contactors for connecting said machines in series and in parallel relation, of means for accelerating said machines through a certain cycle, and means for disconnecting one of said machines without preventing the operation of the remaining machines through said cycle.

2. In a control system, the combination with a plurality of dynamo-electric machines, a resistor therebetween, and a plurality of contactors for connecting said machines in series and in parallel relation, of means for accelerating said machines through a complete cycle, and means comprising a plurality of switches for disconnecting any one of said machines without preventing the operation of the remainder of said machines through said cycle.

3. In a motor-control system, the combination with a plurality of motors, a resistor therebetween, and a plurality of contactors for connecting said motors in series and in parallel relation, of means for accelerating said motors and means for selectively operating said motors through the same cycles.

4. In a motor-control system, the combination with a plurality of motors, a resistor therebetween, and a plurality of contactors for connecting said motors in series and in parallel relation, of means for accelerating said motors and means comprising a plurality of switches for selectively operating said motors through complete cycles.

5. In a motor-control system, the combination with a plurality of motors and a plurality of contactors for connecting said motors in series and in parallel relation, of means comprising a starting resistor connected between said motors for accelerating said motors operable throughout a certain range upon said motors being connected in series or in parallel relation, and means comprising a plurality of switches for disconnecting one of said motors without preventing the operation of the remainder of said motors by said accelerating means throughout said range.

6. In a motor-control system, the combination with a plurality of motors, and starting resistor connected between said motors, of a plurality of contactors for operating said motors, said contactors being capable of shunting successive portions of said resistor and of connecting said motors in series and afterward in parallel relation, and means comprising a plurality of switches for operating a lesser number of said motors through the same cycle as before when an inoperative motor is disconnected from said system.

7. In a motor-control system, the combination with a plurality of motors and a plurality of contactors for connecting said motors in series and in parallel relation, of a starting resistor connected between said motors, a controller for governing the sequence of operation of said contactors, and means for selectively operating said motors without changing the sequence of operation of said contactors.

8. In a motor-control system, the combination with a plurality of motors and a resistor therebetween, of a plurality of contactors for connecting said motors in series and in parallel relation and for varying the active value of said resistor, a controller for governing the seqence of operation of said motors, and means comprising a plurality of switches for selectively operating said motors without changing the sequence of operation of said contactors.

9. In a motor-control system, the combination with a plurality of dynamo-electric machines normally adapted for joint operation and a resistor connected therebetween, of means for operating one of said machines through the normal cycle.

10. In a motor-control system, the combination with a plurality of dynamo-electric machines normally adapted for joint operation and a resistor connected therebetween, of means for operating either of said machines through the normal cycle.

11. In a control system, the combination with a plurality of dynamo-electric machines, a resistor connected therebetween, and a plurality of contactors for connecting said machines in series and in parallel relation, of means for acceleration said machines through a certain cycle, means for disconnecting one of said machines without preventing the operation of the remaining machines through said cycle, and means for preventing improper circuits from being established by said contactors.

12. In a control system, the combination with a plurality of dynamo-electric machines, a resistor connected therebetween, and a plurality of contactors for connecting said machines in series and in parallel relation, of means for accelerating said machines through a certain cycle, means for disconnecting one of said machines without preventing the operation of the remaining machines through said cycle, and means comprising a switch for preventing improper circuit from being established by said contactors.

In testimony whereof, I have hereunto subscribed my name this first day of November 1920.

BASCUM O. AUSTIN.